United States Patent

[11] 3,554,336

[72] Inventor Richard L. Crossman
    Tallmadge, Ohio
[21] Appl. No. 767,324
[22] Filed Oct. 14, 1968
[45] Patented Jan. 12, 1971
[73] Assignee The Goodyear Tire & Rubber Company
    Akron, Ohio
    a corporation of Ohio

[54] AUTOMATIC BRAKE ADJUSTER
    11 Claims, 6 Drawing Figs.

[52] U.S. Cl. .............................................. 188/196,
                                                  188/71.8
[51] Int. Cl. .............................................. F16d 65/54
[50] Field of Search .................................. 188/72—73C,
                                         79.5GE, 196P,R, 71.8

[56] References Cited
    UNITED STATES PATENTS
    2,568,858  9/1951  Kovac ........................ 188/196(R)UX
    2,736,396  2/1956  Rasmussen et al. ............ 188/196(R)
    3,338,354  8/1967  Jeffries ...................... 188/73(C)X Primary Examiner—Duane A. Reger
Attorneys—F. W. Brunner and Paul E. Milliken ABSTRACT: An automatic brake adjuster for compensating for the wear of the brake friction surfaces. The brake piston has a centrally located threaded hole which is resiliently engaged by a threaded split stem. The stem is spring biased toward the closed end of the brake cylinder but upon application of fluid pressure to the cylinder, the piston and the stem move together for a limited distance toward the open end of the cylinder. The stem contacts a stop which prevents it from moving any farther toward the open end of the cylinder while the continued pressure against the piston urges it toward the open end of the cylinder with sufficient force to cause the split portion of the stem to deflect radially inwardly and permit the threaded portion of the cylinder to skip across the threaded portion of the stem until the piston has traveled outwardly a sufficient distance to move the brake friction surfaces in contact and apply the brake. When the brake fluid pressure is released from the cylinder, the spring causes the stem to return to its original retracted position against the closed end of the cylinder. When sufficient wear has occurred in the brake to require adjustment of the clearance, the next time the brake is applied, the piston will skip one or more threads on the stem and position itself axially outwardly on the stem so that when the brake pressure is released and the stem returns to its retracted position, the outer end of the piston will remain in a sufficiently extended position to compensate for the change in brake clearance due to wear.

INVENTOR.
RICHARD L. CROSSMAN
BY
ATTORNEY

INVENTOR.
RICHARD L. CROSSMAN
BY
*A. F. Milliken*
ATTORNEY

INVENTOR.
RICHARD L. CROSSMAN
BY
ATTORNEY

AUTOMATIC BRAKE ADJUSTER

This invention relates to an automatic brake adjuster for adjusting the travel of a brake piston to compensate for wear of the brake friction surfaces.

BACKGROUND OF THE INVENTION

In the prior art, there are many ways of adjusting brake travel to compensate for wear of the brake friction surfaces. Many such adjustment devices require manual adjustment periodically and those adjusters which operate automatically are often cumbersome and complicated and have many moving parts. The closest prior art known to the applicant is U.S. Pat. No. 3,365,029 issued to H. C. Swift. The Swift patent, however, is a more complicated device than the Applicant's and, in addition to being used with a hydraulic brake, is also designed to accommodate a manually operated brake such as a parking brake.

OBJECTS OF THE INVENTION

It is the primary object of this invention to provide an automatic brake adjuster which is simple in construction, lighter in weight, less expensive, and contains a minimum number of moving parts.

Another object of this invention is to provide an automatic brake adjuster which is simple to assemble and requires a minimum amount of maintenance.

Still another object of the invention is to provide a self adjusting piston assembly that can be retrofitted to existing brakes without major modification of the brake parts.

A still further object of the invention is to reduce the temperature in the brake housing caused by heat transmitted through the retraction pin and the pistons.

These and other objects of the invention will become more fully apparent as the description proceeds in the following specification and the attached drawings.

DESCRIPTION OF THE PREFERRED EMBODIMENTS

Figure 1:
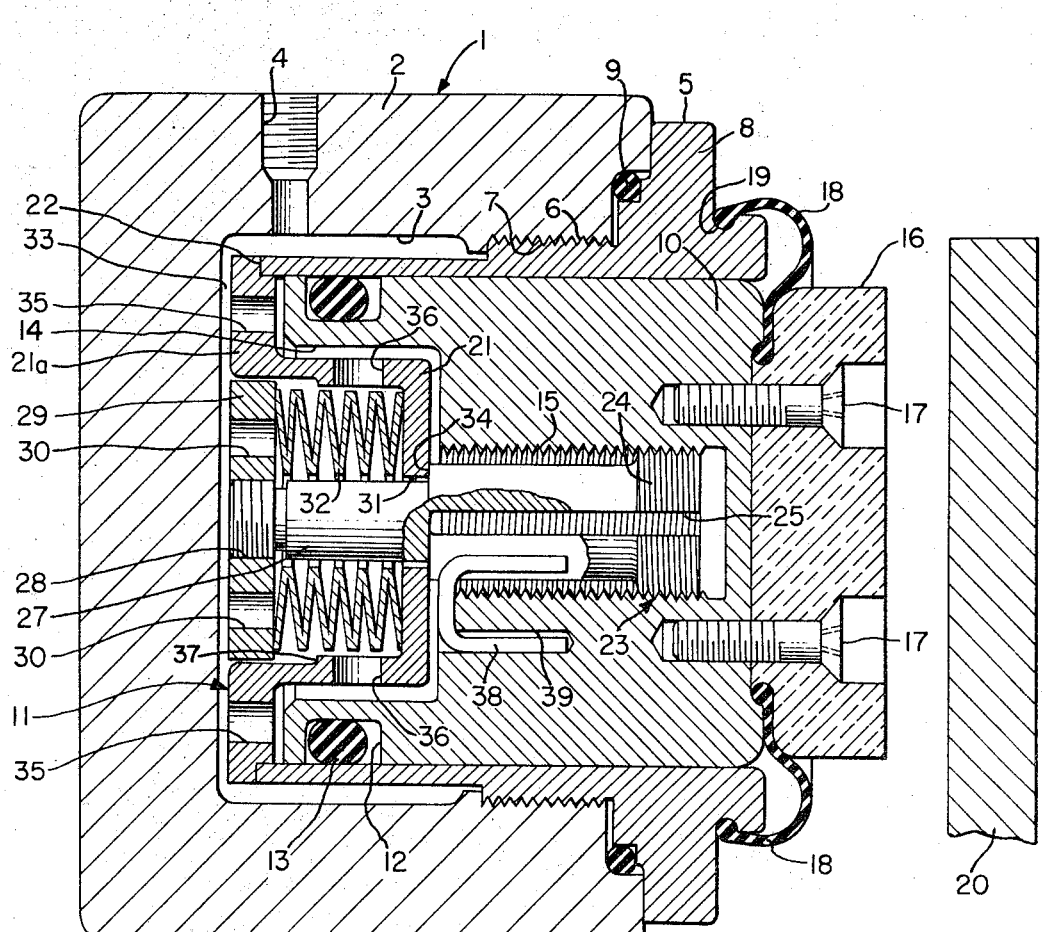
FIG. 1 is a cross-sectional view showing one embodiment of the invention with the brake piston in a retracted position.

Referring now to FIG. 1, a brake housing and piston assembly is indicated generally by the numeral 1. The assembly 1 is normally fastened to a torque plate or other fixed member on a vehicle and is positioned adjacent one or more brake discs or friction surfaces. The present invention may be used in conjunction with a brake having a plurality of rotary discs interleaved between a plurality of stationary discs such as may be seen in U.S. Pat. No. 3,217,844 issued to J. P. Nelson et al. It will also be understood that this invention may be also used with other types of brakes which require a fluid pressure operated piston for actuating the brake friction members. Since the invention resides primarily in the adjustment mechanism, the rest of the brake, including the brake discs, the axle and the wheel, will not be shown in the interest of simplicity. The assembly 1 contains a housing 2 having a cylinder bore 3. A fluid pressure inlet 4 is connected to a brake fluid pressure line (not shown) for bringing hydraulic fluid into the cylinder bore 3. A cylinder sleeve 5 is threaded into the cylinder 3 by a threaded portion 6 on the outside circumference of the sleeve 5 which engages an internal threaded portion 7 inside the cylinder 3. The sleeve 5 has a radially outwardly extending flange 8 which seats against the housing 2 and serves as a stop to determine how far the sleeve 5 may be threaded into the cylinder 3. An O-ring 9 is positioned between the housing 2 and the flange 8 to provide a leakproof seal to prevent fluid pressure from leaking between the sleeve 5 and the housing 2. The sleeve 5 retains a piston 10 and the entire adjustment mechanism 11 within the cylinder 3 as will be described in further detail hereafter. The piston 10 is slidably carried within the sleeve 5. An annular groove 12 located on the radially outer surface of the piston 10 at the axially inner end thereof carries an O-ring 13 which seals against the radially inner surface of the sleeve 5 to prevent escape of hydraulic fluid from the cylinder 3. The piston 10 also has a hollow bore 14 at the axially inner end for containing a portion of the adjustment mechanism 11. A threaded center bore 15 extends into the portion of the cylinder 10 lying axially outwardly from the bore 14. A circular insulator 16 is attached to the axially outer end of the piston 10 by a pair of screws 17. A typical elastomeric dust seal ring 18 is connected to annular groove 19 in the sleeve 5 and is gripped between the piston 10 and the insulator 16. The dust seal ring will permit the piston 10 to slide freely in and out of the cylinder 3 but will prevent particles of dust and dirt from entering between the piston 10 and the sleeve 5 and thereby causing wear of the piston and sleeve or from inhibiting the operation of the piston. The insulator 16 is attached to the piston to prevent heat transfer from the pressure plate 20 and from the brake discs (not shown) against which the pressure plate 20 is brought to bear by actuation of the piston 10. When the brakes are applied, the heat generated by the friction of the discs rubbing together will be transferred through the pressure plate and without an insulator such as the insulator 16 will transfer to the piston and will cause damage to the piston or other brake parts or will create other problems which will prevent efficient operation of the brake. It will be understood that in some types of brakes involving the use of nonmetallic friction pads in combination with brake discs rather than a combination of stationary and rotary metallic discs, a friction pad may be attached directly to the outer end of the piston by any conventional connector means, in the same manner as the insulator 16.

In the embodiment illustrated by FIG. 1, it is contemplated that the pressure plate 20 will bear against an adjacent set of metal discs such as those used in a brake of the type shown and described in U.S. Pat. No. 3,217,844 as previously mentioned.

Figure 4:
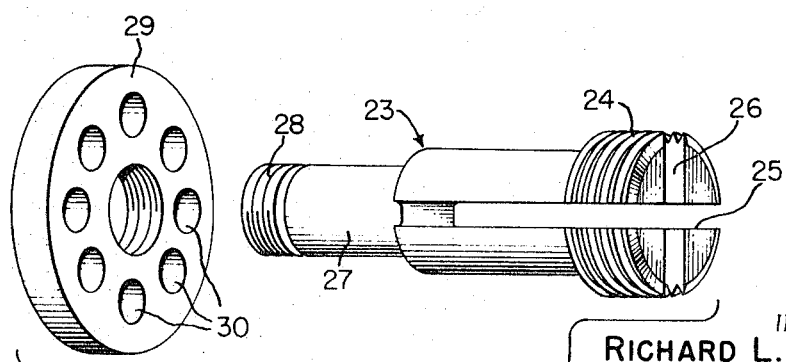
FIG. 4 is an exploded perspective view showing the construction of the split stem of the invention and a retaining nut which is threaded onto the solid end of the stem.
Figure 2:
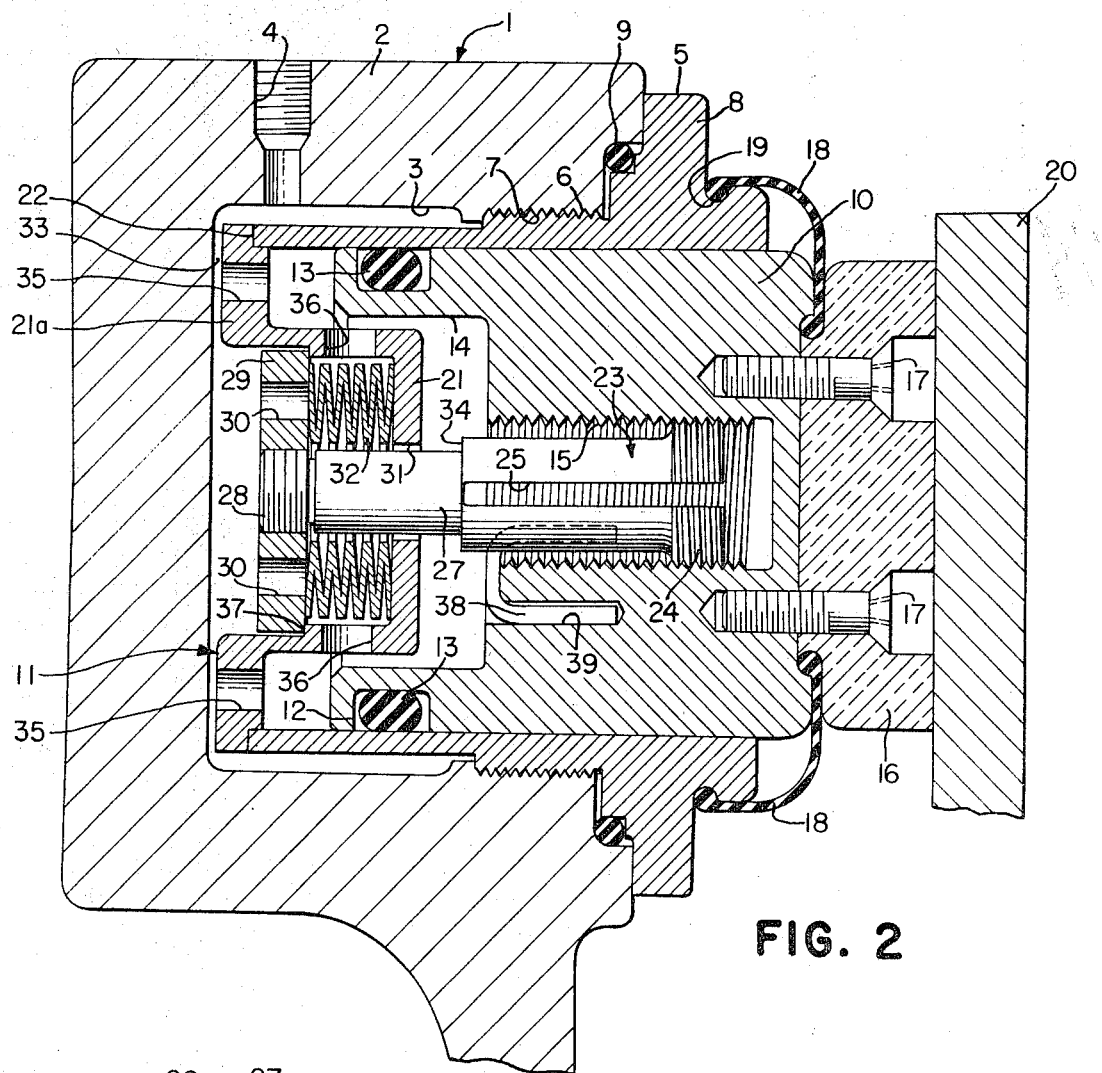
FIG. 2 is a cross-sectional view of the same embodiment shown in FIG. 1 but with the piston in an extended position and with an adjustment having been made by the adjustment mechanism.

The adjustment mechanism 11 has a hat-shaped retaining cup 21 which is held in position within the cylinder 3 by the axially inner end of the sleeve 5 which contacts a ledge 22 near the outer circumference of a flange 21a of the cup 21. A threaded stem 23, as shown in FIG. 4, has a split threaded portion 24 having a pair of splits 25 and 26 passing through the center axis of the stem 23, with the splits 25 and 26 being located at 90° to each other. The splits in the threaded portion 24 permit this part of the stem to be deflected radially inwardly to reduce the stem diameter as will be described later in the specification. In addition to the split portion 24, the stem 23 has a solid portion 27 of smaller diameter than the portion 24. The portion 27 has threads 28 for receiving the stem nut 29 as shown assembled in position in FIG. 1. The stem nut 29 has a plurality of holes 30 to permit the passage of fluid pressure therethrough. When assembled in position, the stem 23 has the split threaded portion 24 screwed into the threaded bore 15 of the piston 10. The solid portion 27 of the stem extends through centrally located hole 31 in the retaining cup 21. A spring 32 is placed in the retaining cup 21 surrounding the solid portion 27 of the stem 23, and the stem nut 29 is screwed onto the threaded portion 28 at the axially inner end of the stem 23 to bear against the spring 32 and hold it in position. The piston 10 and the entire adjustment mechanism 11 are held in position in the cylinder 3 by the sleeve 5. It may be seen that a small clearance 33 is provided between the retaining cup 21 and the back wall of the cylinder 3 to permit the flow of hydraulic fluid to act upon the piston 10. With the piston 10 in the adjustment mechanism 11 assembled as shown in FIG. 1, it may be seen that the spring 32 will bear against the retaining cup 21 and the stem nut 29 and urge them apart. Since the split portion 24 is of larger diameter than the hole 31 in the retaining cup 21, the spring 32 will urge the nut 29 and the stem 23 toward the left until the end 34 of the split portion 24 comes in contact with the cup 21. The end 34 then serves as a stop to prevent further movement of the stem 23 with respect to the retaining cup 21. When fluid pressure is introduced through the inlet 4 into the cylinder 3, it passes through the clearance area 33 through the holes 30 in the nut 29 and through the holes 35 and 36 in the retaining cup 21. All these holes permit the fluid pressure to pass freely through the parts of the adjustment assembly 11 and bear against the inner end of the piston 10. When the hydraulic pressure in the cylinder 3 is sufficient to overcome the resistance of the spring 32, the piston 10 moves to the right as shown in FIG. 2 and brings with it the stem 23 and the stem nut 29. The stem nut 29 compresses the spring 32 and moves to the right until it reaches a stop ledge 37 on the radially inner face of the retaining cup 21. The ledge 37 prevents further movement to the right of either the stem 23 or the stem nut 29. If there is still clearance in the brake when the piston has moved this far, the fluid pressure in the cylinder 3 will cause the piston to continue to the right a sufficient additional distance to apply the brakes. The splits 25 and 26 in the split threaded portion 24 provide sufficient resiliency to permit the threaded portion 24 to deflect radially inwardly and thereby decrease its diameter a sufficient amount to permit the threads of the threaded bore 15 in the piston to skip across the threads of the split threaded portion 24. This permits the piston 10 to move axially with respect to the stem 23 while the stem is being held in a fixed position by the retaining cup 21. When the brakes are applied and there is excess clearance between the piston and the friction elements of the brake, the piston 10 will skip one or more threads on the stem 23 depending upon the amount of adjustment required. Upon release of pressure in the cylinder 3, the spring 32 will move the stem 23 and the piston 10 to the retracted position shown in FIG. 3. It may be seen in FIG. 3 that although the stem 23 and the stem nut 29 have returned to the same position they were in FIG. 1, the piston 10 does not return to the same position within the cylinder but remains slightly extended due to the additional movement of the piston by skipping threads on the stem when the brake is applied, as shown in FIG. 2.

As wear continues on the brake friction elements, the piston will continue to reposition itself further and further axially outwardly along the stem 23 until the friction elements are sufficiently worn that they must be replaced. Upon replacement of the friction elements, the piston 10 is again repositioned to the axially inward position shown in FIG. 1, and the piston again gradually works it way axially outwardly as the friction members continue to wear.

In order to prevent rotation of the piston 10 with respect to the stem 23, it has been found necessary to provide a U-shaped clip 38, one part of which is inserted in a hole 39 in the piston 10 and the opposite part projects loosely into the split 26 in the stem 23. The clip 38 permits the stem 23 and the piston 10 to be moved freely axially in either direction with respect to each other but will prevent relative circumferential movement between the stem and the piston. The clip 38 is necessary since unwanted circumferential movement would result in undesired axial movement of the piston 10 on the stem 23 which would result in improper adjustment of the brake clearance. Although in FIGS. 1 through 3, the piston and adjustment mechanism is shown held in position within the brake cylinder by a cylinder sleeve 5 in some instances, it is desirable to eliminate the use of the cylinder sleeve.

Figure 5:
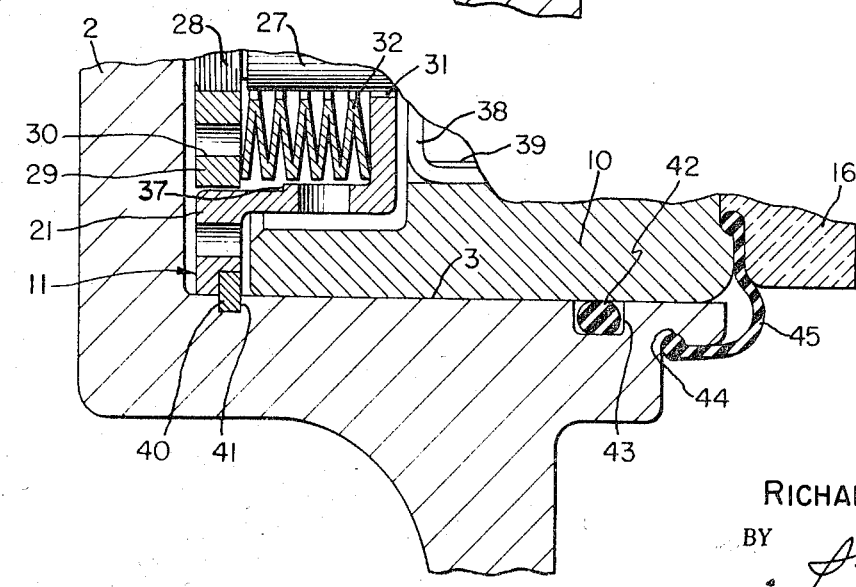
FIG. 5 is a fragmentary cross-sectional view showing another embodiment of the invention.
Figure 3:
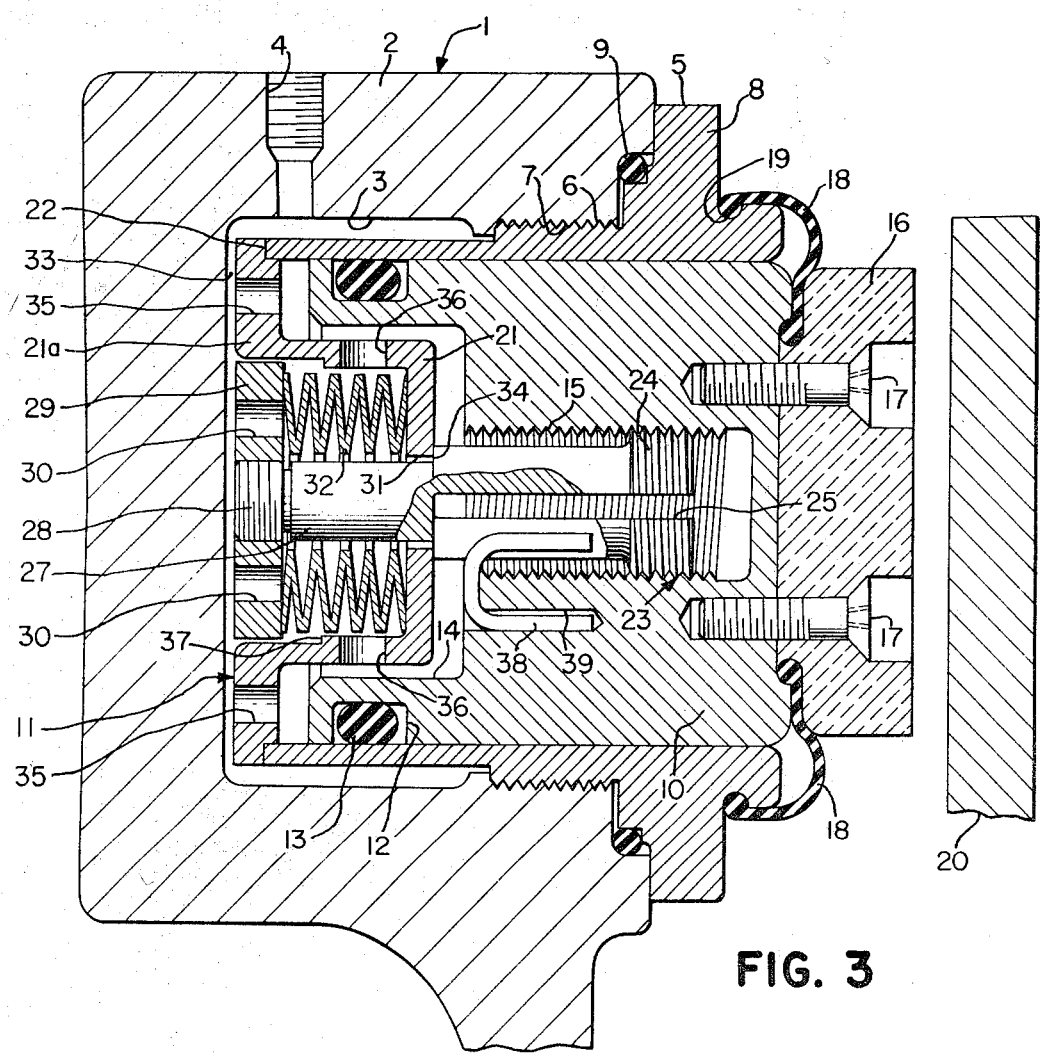
FIG. 3 is a cross-sectional view of the embodiment shown in FIG. 1 but with the piston in a retracted position after adjustment has been made.
Figure 6:
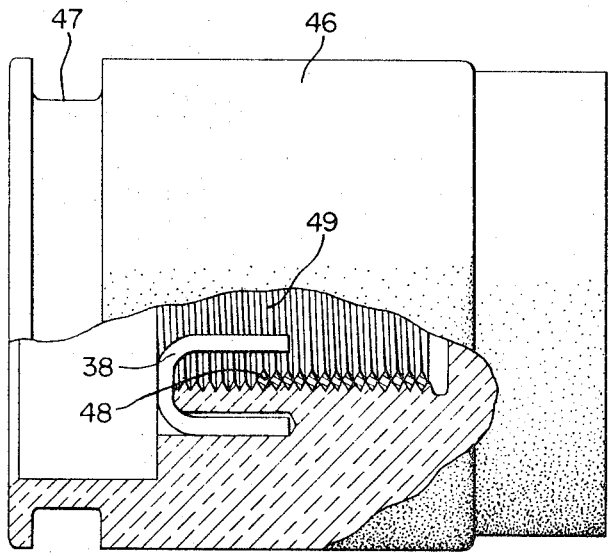
FIG. 6 is a partially broken away side view of another type of piston which may be used with the invention.

In FIG. 5, the adjustment assembly 11 and the piston 10 are held in position by a lock ring 40 which bears against the retaining cup 21 and engages an annular groove 41 in the housing 2. In FIG. 5, a seal ring 42 is located in an annular groove 43 in the inner surface of the cylinder 3 at the axially outer end thereof rather than the seal being located on the axially inner end of the piston as shown in FIGS. 1 through 3. An annular groove 44 is provided at the axially outer end of the cylinder 3 to receive a dust seal ring 45 similar to the ring 18 in the embodiment shown in FIG. 1. In some instances, it may be desirable to make the piston 10 and the insulator 16 as one integral part as shown in FIG. 6 in which an insulator piston is represented by the numeral 46. The piston 46 may be made of any suitable insulating material which is of sufficient strength to withstand the pressures and stresses to which it may be subjected. The piston 46 has an annular groove 47 for receiving an O-ring seal similar to the seal 13 shown in FIG. 1. A U-shaped clip 38 similar to that shown in FIG. 1 is also used with the piston 46. When the piston is made of a nonmetallic material such as the piston 46 in FIG. 6, or when the piston is made of a soft metal such as aluminum, the threaded bore of the piston would not be sufficiently strong to withstand the relative axial movement between the stem and the piston without stripping of the threads within the bore of the piston. To remedy this situation when softer materials are used for the piston, a metallic threaded insert 48 of a hard metal such as steel is inserted in the threaded center bore 49 of the piston 46. Such insert presents a hard threaded portion for engaging the threaded portion of the stem. The threads of the insert 48 are sufficiently hard that they will not be stripped by continued adjustment of the brake. It will be understood that it is also necessary for the threads on the threaded portion of the stem 23 to be of some hard material such as steel or the like.

While the piston and the adjustment assembly have been shown in the drawings as held in place within the cylinder, either by a cylinder sleeve or by a retaining ring, it will also be realized that it is possible to attach the retaining cup 21 to the cylinder by screws or other well known fastening devices without departing from the scope of the invention. It should also be emphasized that it is immaterial whether the seal ring creating a seal between the piston and the cylinder is located on the inner surface of the cylinder or on the outer surface of the piston. A brake friction pad may be substituted for the insulator shown in FIGS. 1 through 3 without departing from the scope of the invention.

Various other changes can be made in the illustrative embodiments shown herein without departing from the scope of the invention.

I claim:

1. An automatic brake adjuster for adjusting the distance of travel of a brake piston in a cylinder to compensate for wear of the brake friction surfaces comprising:
   A. a housing having a cylinder;
   B. a piston within the cylinder, said piston having a threaded portion;
   C. a thread-engaging means for resiliently contacting at least part of the threaded portion of the piston to permit relative axial movement of the cylinder and the thread-engaging means with respect to each other without relative circumferential rotation of either of said parts;
   D. retaining means mounted within the cylinder for permitting limited axial movement of the thread-engaging means with the piston upon application of the brake; and
   E. a sleeve threadably attached to the inner wall of the cylinder for holding the retaining means.

2. An automatic brake adjuster as claimed in claim 1 wherein the threaded portion of the piston is in a hole located centrally in the piston and the thread-engaging means is a threaded stem having at least one split through the portion thereof which engages the threaded hole in the piston, the split permitting the stem to decrease in diameter a sufficient amount to permit the threads of the stem to skip across the threads of the piston when the piston and stem are moved axially with respect to each other.

3. An automatic brake adjuster as claimed in claim 1 wherein the retaining means comprises a retaining cup mounted in a substantially fixed axial position within the cylinder and a spring within the retaining cup biasing the thread-engaging means in a retracted position within the cylinder but upon sufficient pressure against the piston within the cylinder permitting the thread-engaging means to travel a limited distance with the piston toward an extended position.

4. An automatic brake adjuster as claimed in claim 1 wherein the piston is made of metal and has a nonmetallic insulator attached to the axially outer end thereof.

5. An automatic brake adjuster as claimed in claim 1 wherein the piston body is made from a nonmetallic insulating material and has a metal threaded insert located centrally thereof.

6. An automatic brake adjuster for adjusting the distance of travel of a brake piston in a cylinder to compensate for wear of the brake friction surfaces comprising:
   A. a housing having a cylinder;
   B. a piston within the cylinder, said piston having a threaded portion;
   C. a thread-engaging means for resiliently contacting at least part of the threaded portion of the piston to permit relative axial movement of the cylinder and the thread-engaging means with respect to each other without relative circumferential rotation of either of said parts;
   D. means mounted within the cylinder for permitting limited axial movement of the thread-engaging means with the piston upon application of the brake; and
   E. a lock ring engaging an annular groove in the axially inner end of the cylinder for holding the retaining means.

7. An automatic brake adjuster as claimed in claim 6 wherein the threaded portion of the piston is in a hole located centrally in the piston and the thread-engaging means is a threaded stem having at least one split through the portion thereof which engages the threaded hole in the piston, the split permitting the stem to decrease in diameter a sufficient amount to permit the threads of the stem to skip across the threads of the piston when the piston and stem are moved axially with respect to each other.

8. An automatic brake adjuster as claimed in claim 6 wherein the retaining means comprises a retaining cup mounted in a substantially fixed axial position within the cylinder and a spring within the retaining cup biasing the thread-engaging means in a retracted position within the cylinder but upon sufficient pressure against the piston within the cylinder permitting the thread-engaging means to travel a limited distance with the piston toward an extended position.

9. In a disc brake having a pressure plate for exerting pressure against the brake discs, an automatic brake adjuster for adjusting the distance of travel of a brake piston in a cylinder to compensate for wear of the brake friction surfaces comprising:
   A. a housing having a cylinder;
   B. a piston within the cylinder, said piston having a threaded portion;
   C. a thread-engaging means for resiliently contacting at least part of the threaded portion of the piston to permit relative axial movement of the cylinder and the thread-engaging means with respect to each other without relative circumferential rotation of either of said parts;
   D. a retaining cup mounted in a substantially fixed axial position within the cylinder; and
   E. a spring within the retaining cup biasing the thread-engaging means in a retracted position within the cylinder but upon sufficient pressure against the piston within the cylinder permitting the thread-engaging means to travel a limited distance with the piston toward an extended position;
   F. said thread-engaging means when in the retracted position holding the piston out of contact with the pressure plate to minimize heat transfer from the pressure plate to the piston.

10. An automatic brake adjuster as claimed in claim 9 wherein the threaded portion of the piston is in a hole located centrally in the piston and the thread-engaging means is a threaded stem having at least one split through the portion thereof which engages the threaded hole in the piston, the split permitting the stem to decrease in diameter a sufficient amount to permit the threads of the stem to skip across the threads of the piston when the piston and stem are moved axially with respect to each other.

11. An automatic brake adjuster as claimed in claim 10 including a key member attached to the piston and extending into one of the splits in the stem in sliding relationship therewith to permit relative axial movement of the stem and the piston but preventing relative circumferential movement thereof.